March 30, 1926.

L. H. QUINN, SR., ET AL

ADVERTISING CABINET

Filed Nov. 11, 1925  2 Sheets-Sheet 2

1,578,919

Linville H. Quinn Sr.
Thomas G. Klein
INVENTORS

BY Geo. M. Davis
ATTORNEY

Patented Mar. 30, 1926.

1,578,919

UNITED STATES PATENT OFFICE.

LINVILLE H. QUINN, SR., AND THOMAS G. KLEIN, OF TERRE HAUTE, INDIANA.

ADVERTISING CABINET.

Application filed November 11, 1925. Serial No. 68,446.

*To all whom it may concern:*

Be it known that LINVILLE H. QUINN, Sr., and THOMAS G. KLEIN, citizens of the United States, residing at Terre Haute, in the county of Vigo and State of Indiana, have invented new and useful Improvements in an Advertising Cabinet, of which the following is a specification.

This invention relates to a device whereby merchandise, such as clothing, gowns, lingerie, pictures and other objects, may be displayed in suitable and attractive framing, such as a large picture frame, miniature theatre stage, or other like setting, and whereby means of properly disposed and manipulated reflectors and lights, a reflected image may be altered, changed, made to move or be replaced by an invisible operator.

And the objects of the invention are; first, to provide a novel display in show windows, show rooms and other similar places, which will attract unusual attention to the goods displayed; second, to provide such a device, whereby objects disposed in the back ground may be projected into visible foreground; third, to provide such a device whereby the objects displayed may be altered, changed, to other objects, reduced to any desired proportions, revolved or moved to display different positions, and whereby the object displayed may be made to "fade away," and other objects substituted therefor, by means of properly manipulated lights; as for example, a dress model-form may be first shown, and then gradually faded away and merged into a living form bearing lingerie, that to be faded away and merged into a living and moving form dressed in a gown, cloak or the like; fourth, to provide such a device, housed in a light and portable cabinet, which may be moved about and installed, as a unit, in various places; and fifth, to provide such a device, which will be economical in structure and operation.

These objects we attain by means of the device illustrated in the accompanying drawings, in which—

Figure 4, is a detail of the stirrup which supports the concave mirror.

Similar letters and numerals of reference refer to similar parts throughout the several views.

Figure 1:
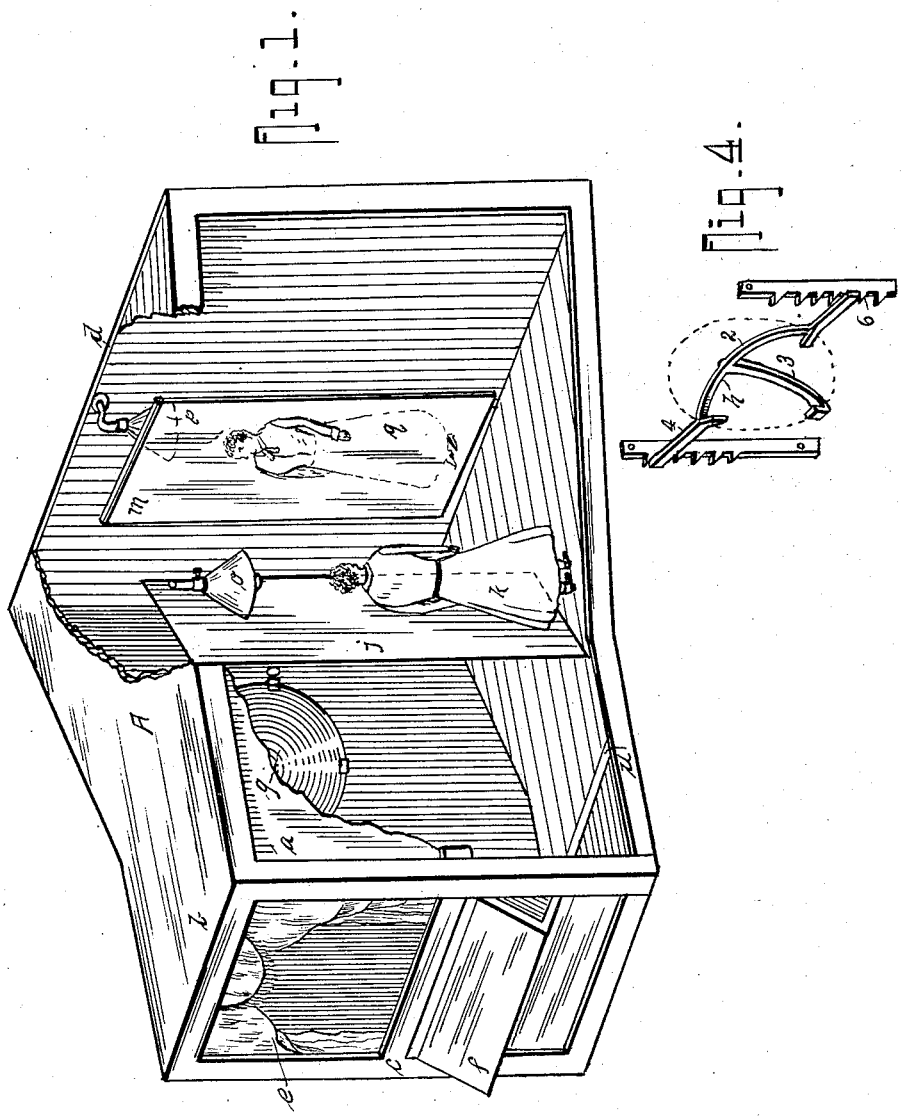
Figure 1, is a perspective view of the device, with a side-wall removed to show the interior arrangement.
Figure 2:
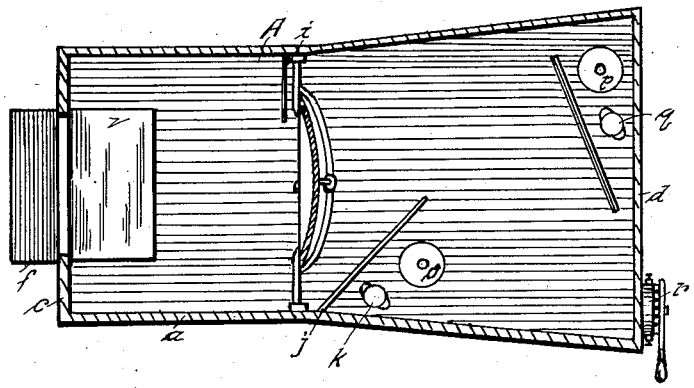
Figure 2, is a plan of the interior of the cabinet.
Figure 3:
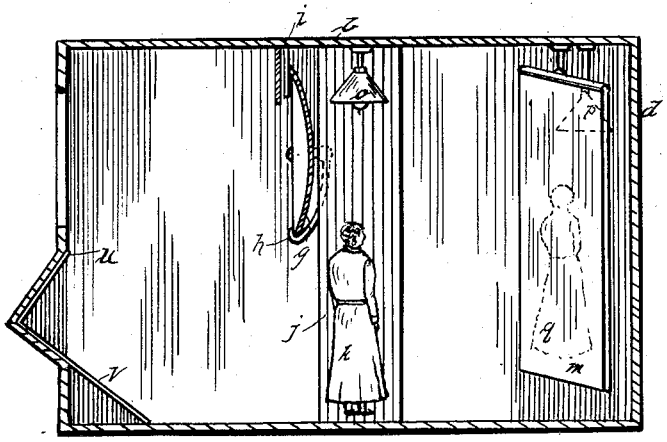
Figure 3, is a vertical sectional view of the device.

The letter A indicates a cabinet, constructed of light-weight material, comprising two side-walls, $a$, a top $b$, a front-wall $c$ and a back-wall $d$, all assembled as shown, with all joints light proof and the entire interior painted dead black. The front-wall is cut in the upper one-half, and the opening so formed is finished upon the exterior in representation of a miniature theatre stage or picture frame, as desired, indicated by the letter $e$. An angular projection $f$, constructed of the wall material, projects from the lower one-half of the front-wall, for the purpose of receiving the hereinafter described mirrors.

A circular concave mirror $g$ is movably mounted in and suspended by an iron stirrup $h$, in a position immediately behind the opening $e$ in the front-wall, properly positioned relative to the hereinafter described mirrors.

The stirrup $h$ consists of a horizontal semi-circular arm 2, provided at either end with a hook, adapted to hook over and hold the edges of said concave mirror, a semi-circular arm 3 which is pendant from the middle of said arm 2, and provided with a hook upon the lower end, adapted to hook over and support the lower edge of said concave-mirror, and two hanger-arms 4, projecting from either end of the horizontal arm 2 and adapted to fit into notches provided therefor, in a pair of perpendicular notched racks 6, attached to opposite sides of the cabinet, and adapted to support the said stirrup $h$, and in the notches of which the stirrup $h$ may be adjusted to any desired height.

A black opaque curtain or shield $i$, is suspended from the top of the cabinet immediately in front of said concave-mirror and is provided with an opening of a diameter slightly less than that of said concave-mirror and adapted to hide the edges of said concave-mirror while exposing the main field thereof.

The letter $j$ indicates an opaque screen extending from the top of the cabinet to the floor, positioned slightly behind the concave-mirror and extending from the side wall $a$ in an angular direction toward the center of the cabinet and adapted to screen off any object stationed behind said curtain or screen from the front portion of the cabinet.

A plate-glass screen *m* is positioned in the rear portion of the cabinet, at an angle determined with reference to the screen *j* and an object *k* stationed therebehind. Strong reflector electric lights, *o* and *p*, are suspended from the upper walls of the cabinet, over and slightly in advance of objects stationed behind said two screens, respectively, adapted to throw strong light upon said objects.

Said electric lights are connected with a dimmer-switch *r*, mounted upon the walls of the cabinet, where the strength of one light may be diminished while the strength of the other light is increased, for the purpose of fading-out one of said objects and its background at the same time that the light thrown upon the other object is increased and the latter object shown to full view.

A pair of mirrors *u* and *v*, are positioned within the angular projection *f* of the front-wall *c*, and are angled, relative to each other, at right angles, and the lower mirror *v* is adapted to receive and reflect objects reflected to it by or through said plate-glass screen *m*, the mirror *u* is adapted to receive and reflect, reflections from the mirror *v* to the concave-mirror.

When so constructed and adjusted, any background, such as a landscape or decorated interior, and objects, such as a human being positioned behind the opaque screen *j*, and thrown into bright light will be reflected from the plate-glass screen *m*, when the light *p* is extinguished and the space behind said plate-glass screen is dark. The reflection upon the plate-glass screen is in turn reflected in the mirror *v* and from it to the mirror *u*, from which it is reflected to the concave-mirror.

The reflection in the mirror *g* is then plainly seen by observers stationed in front of the cabinet, apparently at the point of principal focus of the concave-mirror; and the size and position of the reflection seen by the observers may be altered, by adjustment of the various mirrors.

By means of the dimmer-switch *r*, the light over the object *k* may be slowly diminished and extinguished, thereby obscuring the reflection of the object *k*, while at the same time the light behind the plate-glass screen is gradually switched on and the object *q* stationed behind said plate-glass screen is illuminated and reflected in and by the mirror *v* through the plate-glass of the screen *m* and from there projected into view of the observers via the mirror *u* and the concave-mirror. In this manner any object, a dress-form for example, clothed in lingerie may be first shown and then faded-out and replaced gradually by the reflection of a human form standing behind the plate-glass screen and clothed in gown or cloak, or the like.

The advantages claimed for our invention over other similar devices used prior hereto for similar purposes, consist in the adaptability of the device to any position upon any floor, in store-room, store-window or other place, without the necessity of specially constructed and positioned stages and the ease of displaying changing models without annoying waits and interruptions.

Having described our invention, its operation and advantages, what we claim as new and useful, and desire to secure by Letters Patent is:—

1. In a device of the character set forth, the combination of a cabinet comprising a top, two side-walls, a back-wall and a front-wall, and an angular projection projecting from the lower portion of said front-wall, with a concave-mirror movably mounted within said cabinet in proper position to project reflections through an opening in the front-wall of the cabinet, a set of reflecting mirrors, properly adjusted relative to each other and in position to reflect reflections upon said concave-mirror, an opaque screen positioned behind said concave-mirror and adapted to conceal objects in the rear thereof from said reflecting mirrors, a plate-glass screen stationed in the rear portion of the cabinet and adapted to reflect objects stationed behind said opaque screen when illuminated from in front and to expose objects stationed in the rear thereof when illuminated from behind the same, all substantially as set forth.

2. In a device of the character set forth, the combination of a cabinet comprising enclosing opaque walls, and top, a frame-like opening in the front wall, and an angular recess formed by projecting members fixed in said front-wall, with a suspended concave-mirror positioned behind the opening in the front-wall, a pair of angularly positioned reflecting mirrors mounted in said angular recess and adapted to reflect objects upon said concave-mirror, means of adjustably suspending said concave-mirror, an opaque screen positioned behind and to one side of said concave-mirror and adapted to shield objects stationed behind said opaque screen from direct view of the said pair of reflecting mirrors, a plate-glass screen angled and positioned relative to the reflecting mirrors and to the opaque screen with a lighting system comprising an electric lamp behind said opaque screen, an electric light positioned behind said plate-glass screen, suitable wiring and a dimmer-switch, adapted to control said electric lights, relative to each other, all substantially as set forth.

3. In a device of the character set forth, the combination of a cabinet, a frame-like opening in the front-wall of said cabinet adapted to expose a concave-mirror within said cabinet, with a concave-mirror suspended within said cabinet, means of suspending and adjusting said concave-mirror, a set of cooperating reflecting mirrors positioned properly to reflect objects upon said concave-mirror, an opaque screen positioned behind said concave-mirror and adapted to screen the space and objects in its rear from said set of reflecting mirrors, a transparent screen positioned in the rear portion of said cabinet and adapted to reflect objects stationed behind said opaque screen when lighted from in front and to display objects stationed in the rear thereof, when lighted from behind, a system of electric lights and a dimmer-switch adapted to illuminate the various parts of the cabinet as desired, all substantially as set forth.

LINVILLE H. QUINN, Sr.
THOMAS G. KLEIN.